(12) United States Patent
Li et al.

(10) Patent No.: US 12,277,690 B2
(45) Date of Patent: *Apr. 15, 2025

(54) IMAGE PROCESSING METHOD AND APPARATUS, COMPUTING DEVICE, AND STORAGE MEDIUM

(71) Applicant: TENCENT TECHNOLOGY (SHENZHEN) COMPANY LIMITED, Shenzhen (CN)

(72) Inventors: Benchao Li, Shenzhen (CN); Feng Li, Shenzhen (CN); Chenghao Liu, Shenzhen (CN); Yi Liu, Shenzhen (CN); Juanhui Tu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,765

(22) Filed: Mar. 14, 2024

(65) Prior Publication Data

US 2024/0303792 A1  Sep. 12, 2024

Related U.S. Application Data

(63) Continuation of application No. 17/572,579, filed on Jan. 10, 2022, now Pat. No. 11,983,852, which is a
(Continued)

(30) Foreign Application Priority Data

Dec. 12, 2019 (CN) .......................... 201911274591.0

(51) Int. Cl.
*G06T 5/92* (2024.01)
*G06T 5/70* (2024.01)
*G06T 7/90* (2017.01)

(52) U.S. Cl.
CPC ............... *G06T 5/92* (2024.01); *G06T 5/70* (2024.01); *G06T 7/90* (2017.01); *G06T 2207/10024* (2013.01)

(58) Field of Classification Search
CPC .... G06T 5/92; G06T 7/90; G06T 5/70; G06T 2207/10024
See application file for complete search history.

(56) References Cited

U.S. PATENT DOCUMENTS 6,774,943 B1  8/2004 Kao et al.
7,426,312 B2  9/2008 Dance et al.
(Continued)

FOREIGN PATENT DOCUMENTS

CN  1320324 A  10/2001
CN  103824250 A  5/2014
(Continued)

OTHER PUBLICATIONS

The World Intellectual Property Organization (WIPO) International Search Report for PCT/CN2020/105019 Oct. 20, 2020 5 Pages (including translation).
(Continued)

*Primary Examiner* — Gregory M Desire
(74) *Attorney, Agent, or Firm* — ANOVA LAW GROUP, PLLC

(57) ABSTRACT

An image processing method includes: determining a brightness value of an image; and enhancing a brightness of the image when the brightness value of the image is less than an image brightness threshold. Enhancing the brightness of the image includes: determining each pixel of the image as a target pixel; determining a brightness enhancement value of the target pixel based on the brightness value of the image, an initial brightness value of the target pixel, and initial brightness values of neighboring pixels of the target pixel;
(Continued)

and using the brightness enhancement value as an enhanced brightness value of the target pixel.

20 Claims, 7 Drawing Sheets

Related U.S. Application Data continuation of application No. PCT/CN2020/105019, filed on Jul. 28, 2020.

(56) References Cited

U.S. PATENT DOCUMENTS

| | | | |
|---|---|---|---|
| 9,449,252 B1 * | 9/2016 | Usikov | H04N 1/60 |
| 9,674,427 B2 | 6/2017 | Vranceanu | |
| 9,691,139 B2 * | 6/2017 | Usman | H04N 19/86 |
| 10,097,765 B2 | 10/2018 | Sheikh et al. | |
| 10,489,928 B2 | 11/2019 | Shamilov et al. | |
| 10,572,983 B2 * | 2/2020 | Pouli | G06T 5/94 |
| 10,853,925 B2 * | 12/2020 | Xiao | G06T 5/90 |
| 10,856,389 B2 | 12/2020 | Zhang | |
| 10,949,952 B2 | 3/2021 | Huang et al. | |
| 10,979,686 B2 | 4/2021 | Hasegawa | |
| 10,997,700 B2 | 5/2021 | Wu et al. | |
| 11,055,831 B2 * | 7/2021 | Qian | G06T 5/94 |
| 11,062,428 B2 | 7/2021 | Wang | |
| 11,182,883 B2 * | 11/2021 | Kagawa | G06K 15/1878 |
| 2008/0025635 A1 | 1/2008 | Han et al. | |
| 2015/0016722 A1 | 1/2015 | Onda et al. | |
| 2018/0005359 A1 | 1/2018 | Deng | |
| 2019/0228511 A1 | 7/2019 | Wu et al. | |
| 2021/0295801 A1 | 9/2021 | Chao et al. | |

FOREIGN PATENT DOCUMENTS

| | | |
|---|---|---|
| CN | 110120021 A | 8/2019 |
| CN | 110278425 A | 9/2019 |
| CN | 110288546 A | 9/2019 |
| CN | 110910333 A | 3/2020 |

OTHER PUBLICATIONS

The European Patent Office (EPO) Extended Search Report for EP Application No. 20899802.1 Sep. 8, 2022 36 Pages.

* cited by examiner

IMAGE PROCESSING METHOD AND APPARATUS, COMPUTING DEVICE, AND STORAGE MEDIUM

CROSS-REFERENCES TO RELATED APPLICATIONS

This application is a continuation application of U.S. application Ser. No. 17/572,579 filed on Jan. 10, 2022; U.S. application Ser. No. 17/572,579 is a continuation application of PCT Patent Application No. PCT/CN2020/105019, filed on Jul. 28, 2020, which claims priority to Chinese Patent Application No. 201911274591.0, entitled "IMAGE PROCESSING METHOD AND IMAGE PROCESSING APPARATUS" filed with the China National Intellectual Property Administration on Dec. 12, 2019, the entire contents of all of which are incorporated herein by reference.

FIELD OF THE TECHNOLOGY

The present disclosure relates to the field of image processing technologies, and specifically, to an image processing method and apparatus, a computing device, and a storage medium.

BACKGROUND OF THE DISCLOSURE

With the development of Internet technologies, requirements for image quality are increasingly high in all walks of life. For example, as a most important part among the functions of an office collaboration product, the remote video conference has a high requirement for the image quality of a video. If a user is in a poor lighting environment, the image quality of a scenario in the video conference will be relatively poor. If the scenario image in such environment is not processed, experience of the video conference will be quite poor.

To display a high-quality image, a brightness of an image generally needs to be enhanced. However, in the current image processing method, enhancement of a pixel brightness generally depends on an enhancement result of another pixel before the pixel is enhanced, which undoubtedly causes the enhancement process of the image brightness occupies a large amount of image processing resources, such as valuable Central Processing Unit (CPU) resources, for a long time. For example, in the field of video conferences, most processing resources of the video conference system are used for such image processing tasks, which greatly hinder the performance improvement of the video conference system.

SUMMARY

In view of this, embodiments of the present disclosure provide an image processing method and apparatus, a computing device, and a storage medium.

According to an aspect of the embodiments of the present disclosure, an image processing method is provided. The method is performed by a computing device, and includes: determining a brightness value of an image; and enhancing a brightness of the image when the brightness value of the image is less than an image brightness threshold. Enhancing the brightness of the image includes: determining each pixel of the image as a target pixel; determining a brightness enhancement value of the target pixel based on the brightness value of the image, an initial brightness value of the target pixel, and initial brightness values of neighboring pixels of the target pixel; and using the brightness enhancement value as an enhanced brightness value of the target pixel.

According to another aspect of the embodiments of the present disclosure, an image processing apparatus is provided, which includes: a determining module, configured to determine a brightness value of an image; and an enhancement module, configured to enhance a brightness of the image when the brightness value of the image is less than an image brightness threshold. The enhancement module further includes: a first determining submodule, configured to determine each pixel of the image as a target pixel; a second determining submodule, configured to determine a brightness enhancement value of the target pixel based on the brightness value of the image, an initial brightness value of the target pixel, and initial brightness values of neighboring pixels of the target pixel; and an enhancement submodule, configured to use the brightness enhancement value as an enhanced brightness value of the target pixel.

According to still another aspect of the present disclosure, a computing device is provided, which includes a processor and a memory, the memory being configured to store computer executable instructions. The processor is configured, when executing the instructions, to perform: determining a brightness value of an image; and enhancing a brightness of the image when the brightness value of the image is less than an image brightness threshold. Enhancing the brightness of the image includes: determining each pixel of the image as a target pixel; determining a brightness enhancement value of the target pixel based on the brightness value of the image, an initial brightness value of the target pixel, and initial brightness values of neighboring pixels of the target pixel; and using the brightness enhancement value as an enhanced brightness value of the target pixel.

According to yet another aspect of the present disclosure, a non-transitory computer readable storage medium is provided, which stores computer executable instructions, the instructions, when being executed by a processor, cause a processor to perform: determining a brightness value of an image; and enhancing a brightness of the image when the brightness value of the image is less than an image brightness threshold. Enhancing the brightness of the image includes: determining each pixel of the image as a target pixel; determining a brightness enhancement value of the target pixel based on the brightness value of the image, an initial brightness value of the target pixel, and initial brightness values of neighboring pixels of the target pixel; and using the brightness enhancement value as an enhanced brightness value of the target pixel.

BRIEF DESCRIPTION OF THE DRAWINGS

Embodiments of the present disclosure will be described in more detail with reference to the accompanying drawings.

DESCRIPTION OF EMBODIMENTS

The following descriptions provide specific details for thoroughly understanding and implementing various embodiments of the present disclosure. Persons skilled in the art can understand that the technical solutions of the present disclosure may be implemented without these details in some cases. In some cases, some well-known structures and functions are not shown or described in detail to make the descriptions of the embodiments of the present disclosure clearer. Terms used in the embodiments of the present disclosure is to be understood in its broadest reasonable manner, even if they are used in combination with specific embodiments of the present disclosure.

First, some terms involved in the embodiments of the present disclosure are described to help persons skilled in the art to understand the present disclosure.

LUT: Look-Up-Table, which essentially is a RAM. After data is pre-written in the RAM, each time a signal is inputted, it is equivalent to inputting an address to look up the table and find out content corresponding to the address, and then outputting the content. The LUT has a wide range of applications, for example, the LUT may be used as a mapping table of pixel brightness, which converts an actual sampled pixel brightness value (for example, through inversion, binarization, linear or non-linear conversion) to another corresponding brightness value, thereby highlighting useful information of the image and enhancing light contrast of the image.

RGB color space: the RGB color space is based on three primary colors of Red (R), Green (G), and Blue (B), which are superimposed to varying degrees to produce rich and extensive colors, so it is commonly known as the three primary color mode. The greatest advantage of the RGB color space is intuitive and easy to understand, and the disadvantage thereof is that the three components of R, G, and B are highly related, that is, if a component of one color changes to a certain extent, the color will be likely to change.

YUV color space: RGB signals may undergo a series of conversions to obtain one brightness signal Y and two color difference signals R-Y (that is, U) and B-Y (that is, V). This representation method of color is referred to as YUV color space representation. The importance of using the YUV color space is that the brightness signal Y and the chrominance signals U and V are separated. "Y" represents a brightness, that is, a grayscale value, and "U" and "V" represent chrominance, which is to describe the color and saturation of an image, and is used for specifying a pixel color. Generally, color spaces such as Y'UV, YUV, YCbCr, and YPbPr all may be collectively referred to as the YUV color space.

Figure 1:
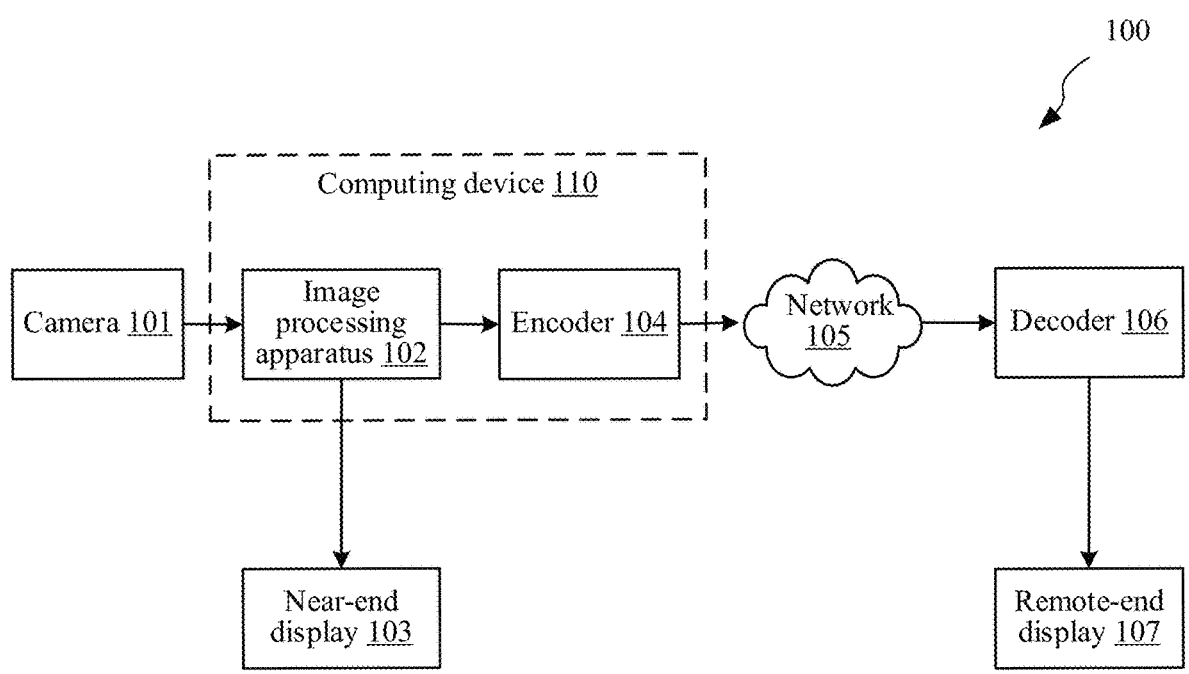
FIG. 1 shows an exemplary application scenario in which the embodiments of the present disclosure can be implemented.

FIG. 1 is an exemplary application scenario 100 in which the technical solutions according to the embodiments of the present disclosure can be implemented. As shown in FIG. 1, the application scenario 100 typically may be a scenario of a video conference, where a participant at a near end (that is, local) has a video conference with a participant at a remote end in the scenario. As shown in FIG. 1, a camera 101 at the near end of the video conference may capture a video of the video conference. The video is formed by a series of video frames, and the video frames are, for example, near-end images of a local participant or a speaker in the video conference. If there is poor light in the environment of the local video conference, quality (in particular, brightness) of the near-end image captured by the camera will be relatively poor. In this case, an image processing apparatus 102 in a computing device 110 may be configured to enhance a brightness of the image to obtain an enhanced image having relatively good quality. On the one hand, the enhanced image may be displayed on a local display 103. On the other hand, the enhanced image may also be transmitted to the remote end of the video conference for display to the far-end participant. As an example, an encoder 104 in the computing device 110 may be used to encode the enhanced image, and then the encoded image is transmitted to the remote end via a network 105. At the remote end, a decoder 106 may be used to decode the received encoded image, and then the decoded image may be displayed on a remote-end display 107, so that the remote-end participant can watch the high-quality near-end image.

The network 105, for example, may be a Wide Area Network (WAN), a Local Area Network (LAN), a wireless network, a public telephone network, an intranet, and any other type of network well-known to persons skilled in the art. The scenario described above is just an example in which the embodiments of the present disclosure can be implemented. Actually, the embodiments of the present disclosure may be implemented in any scenario in which image processing, and in particular, brightness enhancement of the image is needed.

Figure 2:
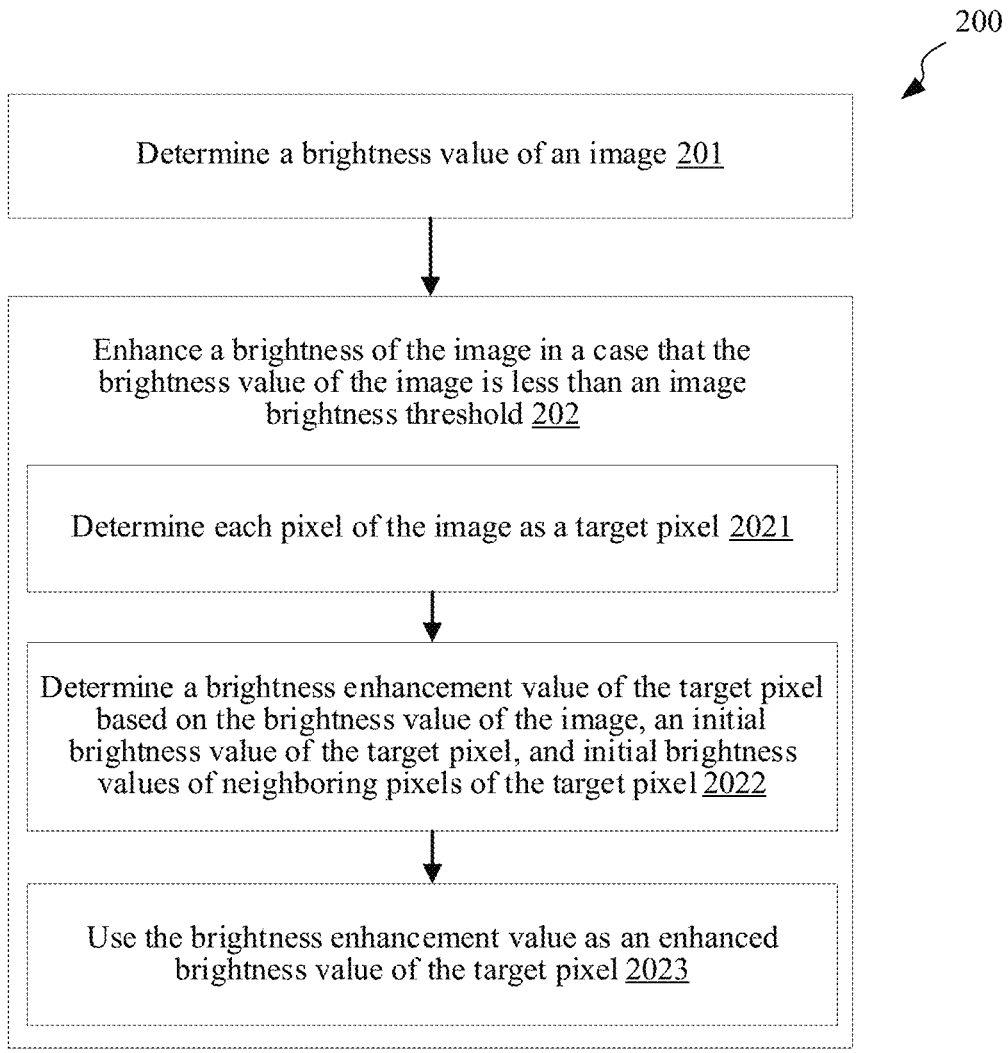
FIG. 2 is a schematic flowchart of an image processing method according to an embodiment of the present disclosure.

FIG. 2 is a schematic flowchart of an image processing method 200 according to an embodiment of the present disclosure. The method 200 is performed by a computing device, for example, the computing device 110 shown in FIG. 1 or the computing device 910 shown in FIG. 9. As shown in FIG. 2, the method 200 includes the following steps.

In step 201, determine a brightness value of an image.

The brightness value of the image may be determined in various manners. In some embodiments, the image is represented in the format of YUV color space data. In the YUV space, each color has a brightness component Y and two chrominance components U and V. In this case, the YUV color space data of the image may be obtained first, and then the brightness value of the image may be determined based on the brightness component in the YUV color space data.

In some embodiments, the image is represented in the format of RGB color space data. The RGB color space is a space defined according to the colors of Red (R), Green (G), and Blue (B) recognized by human eyes. In the RGB color space, the hue, brightness and saturation are represented together and are hard to separate. In this case, the RGB color space data of the image may be obtained first, and then the RGB color space data of the image may be converted to the YUV color space data of the image.

As an example, the RGB color space data of the image may be converted to the YUV color space data of the image according to the following formulas:

$$Y = 0.299R + 0.587G + 0.114B \quad (1)$$
$$U = -0.1687R - 0.3313G + 0.5B + 128 \quad (2)$$
$$V = 0.5R - 0.4187G - 0.0813B + 128 \quad (3)$$

In some embodiments, any appropriate method may be used for determining the brightness value of the image based on a brightness component Y in the YUV color space data. For example, brightness components of all pixels of the image may be obtained, and then an average value of the brightness components may be used as the brightness value of the image. Definitely, this is not limited in the present disclosure. Any other appropriate method will be considered.

In step 202, enhance a brightness of the image when the brightness value of the image is less than an image brightness threshold.

In other words, the brightness of the image may not be enhanced when the brightness value of the image is not less than the image brightness threshold, because in this case the image meets the requirement for the image brightness and generally has a high quality.

Step 202 may further include the following step 2021 to step 2023.

In step 2021, determine each pixel of the image as a target pixel. The target pixel may refer to a pixel to be enhanced.

In the embodiments of the present disclosure, there is a need to enhance the brightness of the image based on each independent pixel.

In step 2022, determine a brightness enhancement value of the target pixel based on the brightness value of the image, an initial brightness value of the target pixel, and initial brightness values of neighboring pixels of the target pixel.

The initial brightness value of the pixel represents the brightness value when the pixel is not enhanced, that is, the brightness value before the pixel is enhanced.

In some embodiments, the neighboring pixels of the target pixel may be pixels other than the target pixel in a region with the target pixel as a central point. The shape and size of the region may be preset according to requirements. As an example, the region may be a square region having a size of 3×3 pixels, which definitely is not limited.

In step 2023, use the brightness enhancement value as an enhanced brightness value of the target pixel.

After the brightness enhancement value of the target pixel is determined, the brightness value of the target pixel may be adjusted to the brightness enhancement value to enhance the brightness of the target pixel. The enhancement of the brightness of the image is implemented by enhancing the brightness of each target pixel.

In the embodiments of the present disclosure, by comprehensively considering the brightness value of the image, the initial brightness value of the target pixel, and the initial brightness values of the neighboring pixels of the target pixel, the quality of the target pixel can be more thoroughly determined, thereby achieving a relatively accurate enhancement result. In addition, the whole enhancement process is performed just based on the initial brightness values of the pixels. Therefore, different from the conventional image processing technologies that rely on dependency or coupling relationships among pixels, in the present disclosure, the enhancement of the brightness of the pixels in the image does not rely on such dependency or coupling relationships and can be performed in parallel, thereby greatly reducing a resource occupancy rate in the image processing process.

Although the embodiments of the present disclosure are described with the enhancement of the image as the theme, the embodiments of the present disclosure may also be applicable to a scenario where a video is enhanced, because enhancing the video essentially is to enhance each frame of image in the video.

Figure 3:
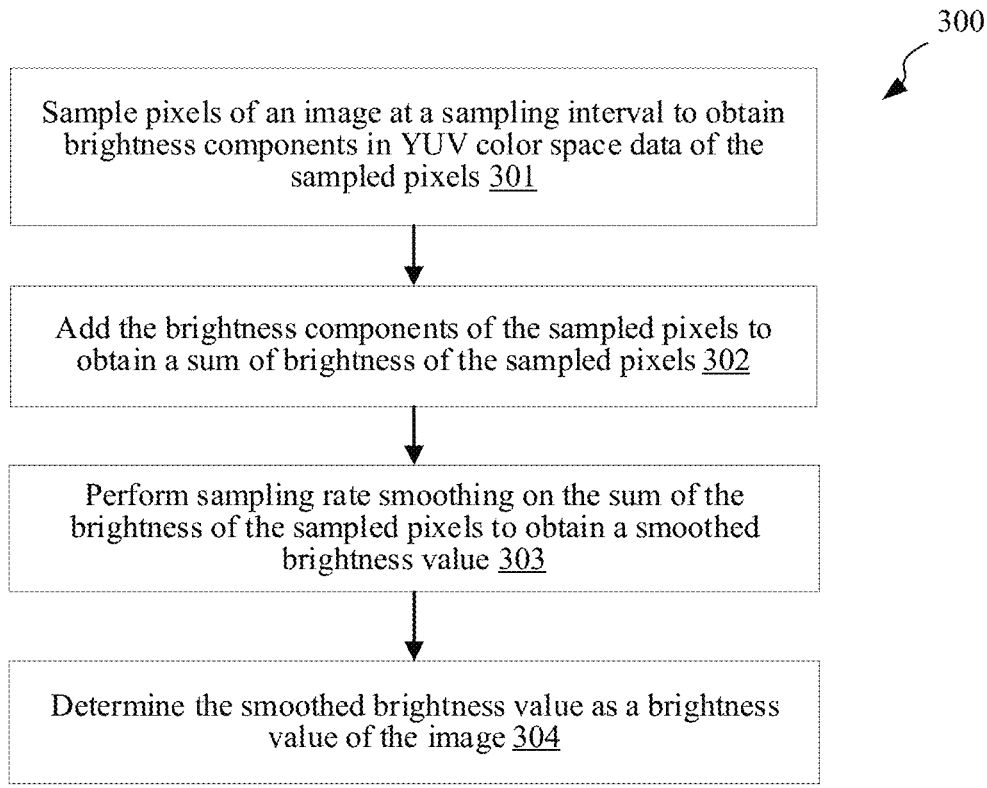
FIG. 3 is an exemplary flowchart of a method for determining, based on a brightness component in YUV color space data of an image, a brightness value of the image according to an embodiment of the present disclosure.

In the foregoing description, after the YUV color space data of the image is obtained, the brightness value of the image may be determined based on the brightness component in the YUV color space data. FIG. 3 is a schematic flowchart of an image processing method 300 for determining, based on a brightness component in YUV color space data of an image, a brightness value of the image according to an embodiment of the present disclosure. The method 300 is performed by a computing device, for example, the computing device 110 shown in FIG. 1 or the computing device 910 shown in FIG. 9. The method 300 includes the following steps.

In step 301, sample pixels of the image at a sampling interval to obtain brightness components in YUV color space data of the sampled pixels.

The sampling interval depends on a sampling rate Y of the pixels of the image. In some embodiments, the sampling interval has a first interval component in a row direction of the pixels of the image, and has a second interval component in a column direction of the pixels of the image. The first interval component is a value obtained by dividing the number of the pixels in the row direction by the sampling rate, and the second interval component is a value obtained by dividing the number of the pixels in the column direction by the sampling rate. During sampling, the sampling may start from a start point of the row direction and the column direction of the image (for example, an upper left corner of the image), and the pixels of the image are sampled at each sampling interval, which definitely is not limited herein.

As an example, assuming that the number of the pixels in the row direction of the pixels of the image is $I_W$ (which is also referred to as an image width), and the number of the pixels in the column direction of the pixels of the image is $I_H$ (which is also referred to as an image height), the first interval component (that is, the sampling interval in the row direction) is $I_W/Y$, and the second interval component (that is, the sampling interval in the column direction) is $I_H/Y$.

In step 302, add the brightness components of the sampled pixels to obtain a sum of brightness of the sampled pixels, that is, add the brightness values of all sampled pixels to obtain the sum of the brightness of the sampled pixels $L_T$.

In step 303, perform sampling rate smoothing on the sum of the brightness of the sampled pixels to obtain a smoothed brightness value. As an example, the sum of the brightness of the sampled pixels may be divided by a square of the sampling rate to obtain the smoothed brightness value, that is, the smoothed brightness value $L_S = L_T/(Y^2)$. Other manners that can smooth the sum of the brightness of the sampled pixels can also be considered.

In step 304, determine the smoothed brightness value as the brightness value of the image.

By means of the foregoing steps, the brightness value of the image is determined with the method 300 that is quick, accurate, and occupies fewer resources.

Figure 4:
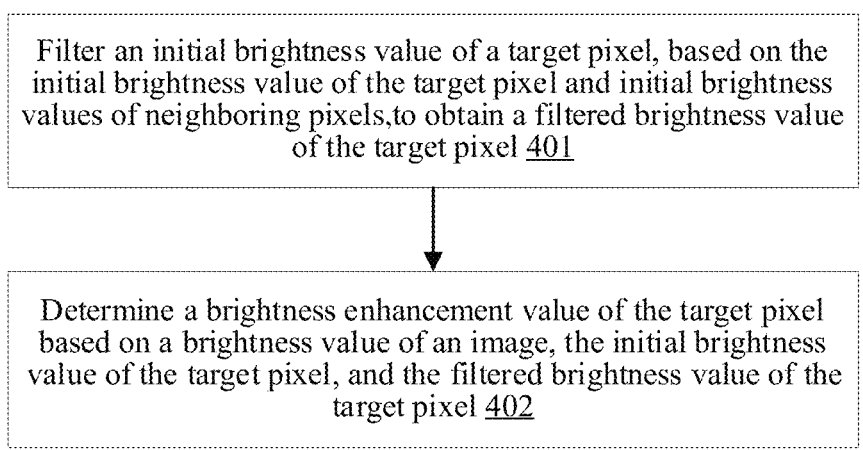
FIG. 4 is an exemplary flowchart of a method for determining, based on a brightness value of an image, an initial brightness value of a target pixel, and initial brightness values of neighboring pixels of the target pixel, a brightness enhancement value of the target pixel according to an embodiment of the present disclosure.

FIG. 4 is an exemplary flowchart of a method 400 for determining, based on a brightness value of an image, an initial brightness value of a target pixel, and initial brightness values of neighboring pixels of the target pixel, a brightness enhancement value of the target pixel according to an embodiment of the present disclosure. The method 400 is performed by a computing device, for example, the computing device 110 shown in FIG. 1 or the computing device 910 shown in FIG. 9. The method 400 may be used for implementing step 2022 described with reference to FIG. 2.

In step 401, filter the initial brightness value of the target pixel, based on the initial brightness value of the target pixel and the initial brightness values of the neighboring pixels of the target pixel, to obtain a filtered brightness value of the target pixel.

In some embodiments, a filtering template may be configured to filer the initial brightness value of the target pixel. The filtering template includes weights which are in one-to-one correspondence to the brightness of the target pixel and the brightness of the neighboring pixels of the target pixel. In this case, the filtering template may be used to determine a weighted sum of the initial brightness value of the target pixel and the initial brightness values of the neighboring pixels. The weights of the brightness of the involved pixels are the weights in the filtering template. Then, the weighted sum is determined as the filtered brightness value of the target pixel. It may be seen that the whole filtering process is performed based on the initial brightness value of the target pixel and the initial brightness values of the neighboring pixels. In other words, in the filtering process, the filtering of a subsequent pixel does not depend on a filtering result of a previous pixel. Therefore, different from the conventional image processing technologies that rely on the dependency of pixels, in the present disclosure, the enhancement of the brightness of the pixels in the image can be performed in parallel, thereby greatly reducing a resource occupancy rate in the image processing process.

Figure 5:
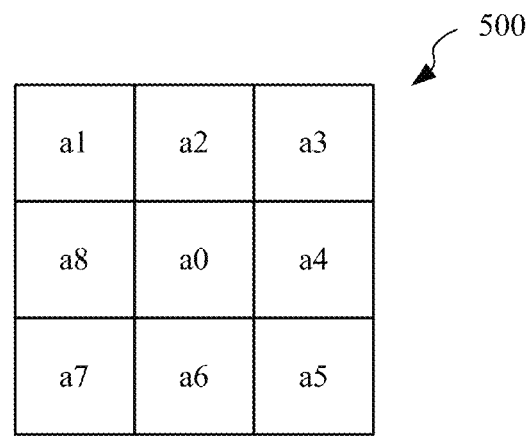
FIG. 5 is a schematic diagram of an exemplary filtering template according to an embodiment of the present disclosure.

As an example, FIG. 5 is a schematic diagram of an exemplary filtering template 500 according to an embodiment of the present disclosure. As shown in FIG. 5, the filtering template corresponds to a square region having a size of 3×3 pixels (including a target pixel and neighboring pixels of the target pixel). The filtering template also includes weights a0, a1, a2, a3, a4, a5, a6, a7, and a8, which are in one-to-one correspondence to the brightness of the target pixel and the brightness of the neighboring pixels of the target pixel, where a0 is a weight corresponding to the brightness of the target pixel, and a1, a2, a3, a4, a5, a6, a7, and a8 are weights corresponding to the weights of the neighboring pixels, and the sum of the weights typically equals 1. Optionally, the value of a0 is ½, the values of a2, a4, a6, and a8 are ⅛, and the values of a1, a3, a5, and a7 are 0, which is beneficial in image processing, especially in image processing of a video conference scenario.

Figure 6:
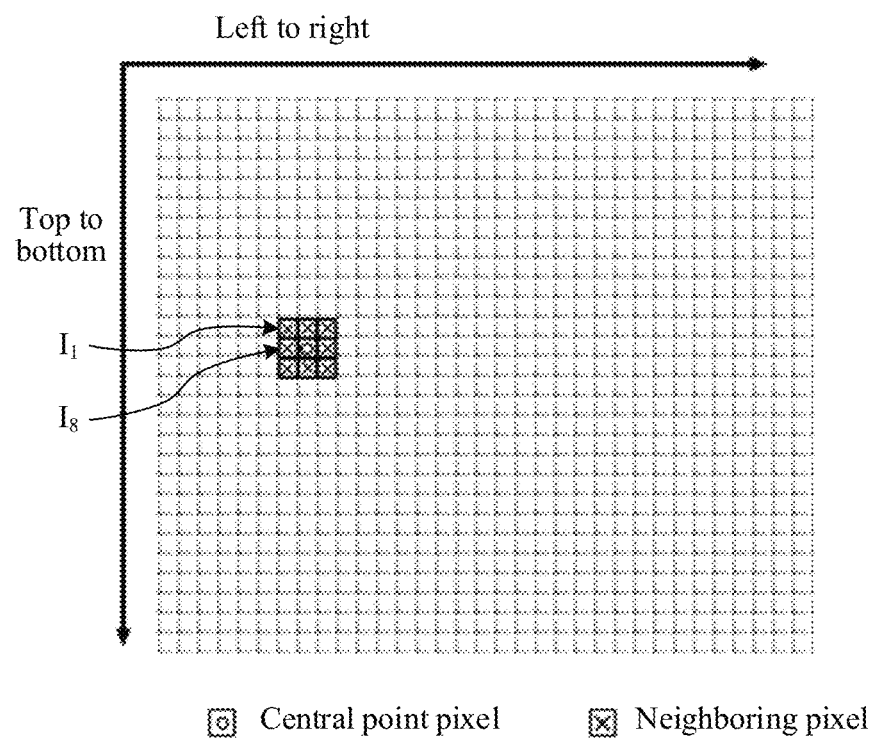
FIG. 6 is a schematic diagram showing that the filtering template of FIG. 5 is used to filter brightness values of pixels of an image.

As an example, FIG. 6 is a schematic diagram showing that the filtering template 500 in FIG. 5 is used to filter brightness values of pixels of an image. As shown in FIG. 6, the brightness values may be filtered in a row direction from left to right and in a column direction from top to bottom of the pixels of the image. Actually, the brightness values of the pixels of the image can be filtered in any order, for example, brightness values of a plurality of pixels at any different positions may be filtered at the same time. This is because the filtering process does not rely on the pixel dependency in conventional technologies. Assuming that an initial brightness value of a central point pixel (that is, a target pixel) shown in FIG. 6 is $I_0$, and initial brightness values of eight neighboring pixels starting from the upper left corner of the central point pixel in a clockwise direction are respectively $I_1$, $I_2$, $I_3$, $I_4$, $I_5$, $I_6$, $I_7$, and $I_8$, and a filtered brightness value of the target pixel (that is, the central point pixel) obtained by using the filtering template shown in FIG. 5 to filter the initial brightness value of the target pixel is $$(I_0 \times a0) + (I_1 \times a1) + (I_2 \times a2) + (I_3 \times a3) + \\ (I_4 \times a4) + (I_5 \times a5) + (I_6 \times a6) + (I_7 \times a7) + (I_8 \times a8) \quad (4)$$

In step 402, determine the brightness enhancement value of the target pixel based on the brightness value of the image, the initial brightness value of the target pixel, and the filtered brightness value of the target pixel. In some embodiments, the brightness enhancement value of the target pixel may be determined according to the following formula, $$E(x) = \frac{I(x) - A}{t(x)} + A \quad (5)$$

where $E(x)$ is the brightness enhancement value of the target pixel, $I(x)$ is the initial brightness value of the target pixel, and $t(x)$ is atmospheric optical transmittance, and an expression of the atmospheric optical transmittance is:

$$t(x) = 1 - w\frac{I_B - E_V}{I_B - A} \quad (6)$$

where $I_B$ is the brightness value of the image, $E_V$ is the filtered brightness value of the target pixel, A is an atmospheric optical intensity value, and w is a non-zero constant, and w optionally is 0.2831.

In some embodiments, each time before a brightness of an image is enhanced, a two-dimensional Look-Up-Table (LUT) among an initial brightness value of a target pixel and a filtered brightness value of the target pixel and a brightness enhancement value of target pixel may be established in advance based on the foregoing formula, where the first dimension represents the initial brightness value of the target pixel, the second dimension represents the filtered brightness value of the target pixel, and the value obtained by looking up in the table is the brightness enhancement value of the target pixel.

As an example, the following algorithm may be used for establishing the two-dimensional LUT in advance:

| LUT Establishing |
|---|
| Input: two-dimensional array $T_{lut}$ = [256][256] |
| 1  Global parameters t, m |
| 2     Initialization parameters t = 0.1, m = 0, values of all elements of $T_{lut}$ are 0 |
| 3     The first dimension of $T_{lut}$ is labeled i, and i is in a range of 0 to 255 |

-continued

| LUT Establishing |
| --- |
| 4   The second dimension of $T_{lut}$ is labeled j, and j is in a range of 0 to 255 |
| 5   $\quad$ t = (0.044 + 0.0039 * j)$^{0.7}$ |
| $\quad\quad$ m = clip((i − 3.0)/t + 3.0) |
| 6   $T_{lut}[i][j] = \text{clip}\left(\left(\dfrac{m}{255.0}\right)^{1.22} * 255.0\right)$ |
| 7   End |
| 8   End |
| $\quad$ Output: Tlut | where the brightness value of the image is 75.59, an atmospheric optical intensity value is 3, i is the initial brightness value I(x) of the target pixel, j is the filtered brightness value $E_V$ of the target pixel, t is an atmospheric optical transmittance, m is the brightness enhancement value E(x) calculated according to the foregoing formula, and $T_{tut}[i][j]$ is the brightness enhancement value of the target pixel obtained by looking up in the table; Clip(•) is a numerical truncation function, if the value is between 0 and 255, the value will be reserved; if the value is less than 0, the value will be set to zero; if the value is greater than 255, the value will be set to 255. The foregoing step is to ensure that the calculated brightness enhancement value m is in the range of 0 to 255, which, therefore, is not necessary, and m may be directly determined as $T_{tut}[i][j]$.

In some embodiments, to make the brightness of the image smoother, the brightness enhancement value E(x) obtained above may be smoothed as follows, that is, clip (0.6*E(x)+0.4*$E_V$). The calculated result is used as the brightness enhancement value of the target pixel to enhance the initial brightness of the target pixel, which definitely is not necessary.

Figure 7:
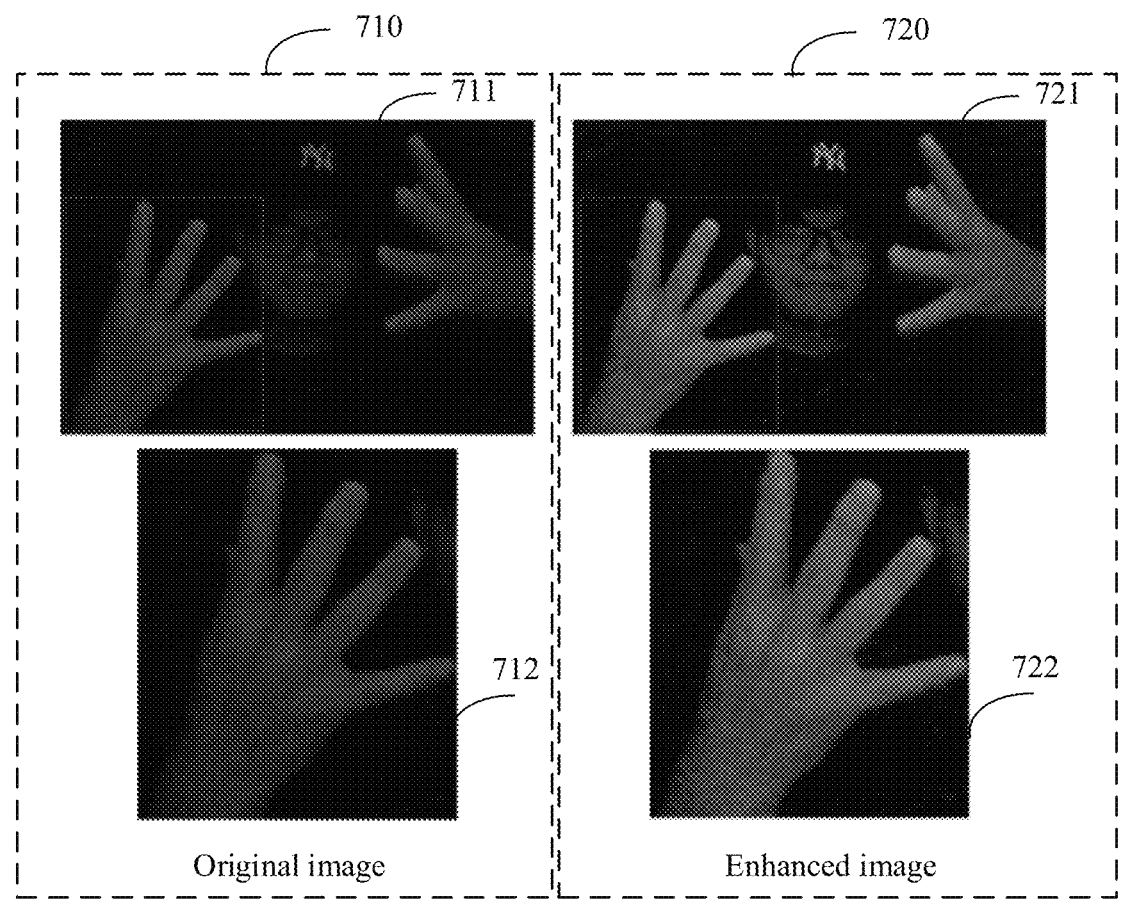
FIG. 7 is a schematic diagram of the effect of using the image processing method according to the embodiments of the present disclosure to enhance an original image.

FIG. 7 is a schematic diagram of the effect of using the image processing method according to the embodiments of the present disclosure to enhance an original image. It may be seen that, compared with an original image 710 on the left, on an enhanced image 720 on the right of FIG. 7, both brightness 721 and brightness 711 of the overall image and brightness 722 and brightness 712 of a local part (for example, hand area) of the image are enhanced, and quality of the enhanced image is improved obviously. In addition, resource occupancy rates of the image processing method with parallel processing and pixel decoupling according to the embodiments of the present disclosure and a conventional image processing method that relies on pixel dependency or pixel coupling on different hardware platforms were compared, and comparison result is shown in table 1.

TABLE 1

| Model | CPU occupancy rate corresponding to the image processing method of conventional technologies | CPU occupancy rate corresponding to the image processing method of the embodiments of the present disclosure |
| --- | --- | --- |
| MacBook Pro, 13 inch, 2017, two Thunderbolt 3 ports | 10.02% | 3.1% |
| MacBook Pro, 15 inch, 2018 | 7.75% | 2.09% |
| Thinkpad X1 | 10.05% | 0.48% |

It may be seen that, compared to the image processing method of the conventional technologies, the image processing method according to the embodiments of the present disclosure greatly reduces the resource occupancy rate in the image processing process.

Figure 8:
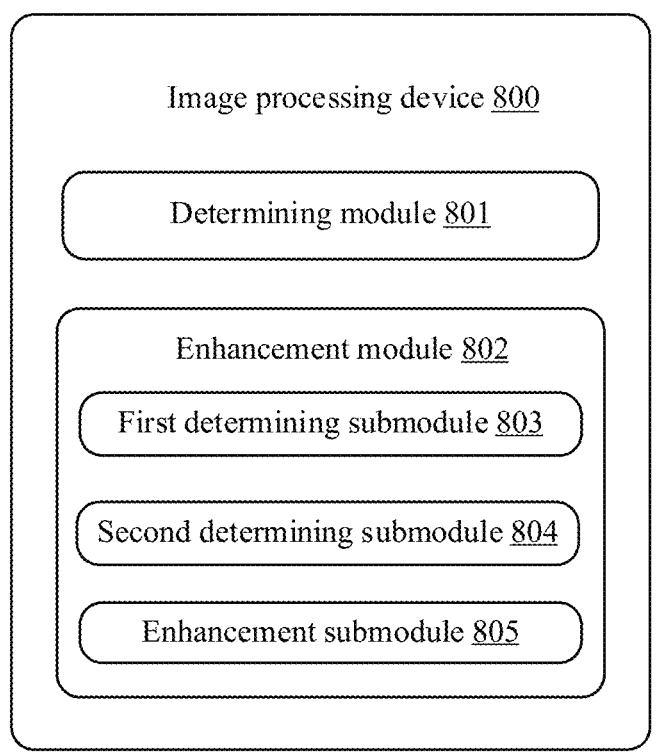
FIG. 8 is an exemplary structural diagram of an image processing apparatus according to an embodiment of the present disclosure.

FIG. 8 is an exemplary structural diagram of an image processing apparatus 800 according to an embodiment of the present disclosure. The image processing apparatus 800 is located in a computing device, for example, the computing device 110 shown in FIG. 1. As shown in FIG. 8, the apparatus 800 includes a determining module 801 and an enhancement module 802, where the enhancement module 802 further includes a first determining submodule 803, a second determining submodule 804, and an enhancement submodule 805.

The determining module 801 is configured to determine a brightness value of an image.

The determining module 801 may be configured to determine the brightness value of the image in various manners. In some embodiments, the image is represented in the format of YUV color space data. In the YUV space, each color has a brightness component Y and two chrominance components U and V. In this case, the determining module 801 may be configured to obtain YUV color space data of the image, and to determine the brightness value of the image based on the brightness component in the YUV color space data.

In some embodiments, the determining module 801 may be configured to obtain RGB color space data of the image, and to convert the RGB color space data of the image to the YUV color space data of the image.

In some embodiments, the determining module 801 may be configured to: sample pixels of the image at a sampling interval to obtain brightness components in YUV color space data of the sampled pixels; add the brightness components of the sampled pixels to obtain a sum of brightness of the sampled pixels; perform sampling rate smoothing on the sum of the brightness of the sampled pixels to obtain a smoothed brightness value; and determine the smoothed brightness value as the brightness value of the image.

The enhancement module 802 is configured to enhance a brightness of the image when the brightness value is less than an image brightness threshold. In other words, the brightness of the image may not be enhanced by using the enhancement module 802 when the brightness value is not less than an image brightness threshold, because the image meets the requirement for the brightness of the image and generally has a high quality.

The first determining submodule 803 is configured to determine each pixel of the image as a target pixel.

The second determining submodule 804 is configured to determine a brightness enhancement value of the target pixel based on the brightness value of the image, an initial brightness value of the target pixel, and initial brightness values of neighboring pixels of the target pixel. The initial brightness value represents the brightness value when the target pixel is not enhanced, that is, the brightness value before the pixel is enhanced.

In some embodiments, the neighboring pixels of the target pixel may be pixels other than the target pixel in a region with the target pixel as a central point. The shape and size of the region may be preset according to requirements. As an example, the region may be a region having a size of 3×3 pixels, which definitely is not limited.

In some embodiments, the second determining submodule 804 may be configured to filter the initial brightness value of the target pixel, based on the initial brightness value of the target pixel and the initial brightness values of the neighboring pixels of the target pixel, to obtain a filtered brightness value of the target pixel; and to determine the brightness enhancement value of the target pixel based on the brightness value of the image, the initial brightness value of the target pixel, and the filtered brightness value of the target pixel. As an example, the second determining submodule 804 may be configured to determine a weighted sum of the initial brightness value of the target pixel and the initial brightness values of the neighboring pixels, and to determine the weighted sum as the filtered brightness value of the target pixel.

In some embodiments, the second determining submodule 804 may be configured to determine the brightness enhancement value of the target pixel according to the following formula, $$E(x) = \frac{I(x) - A}{t(x)} + A$$

where E(x) is the brightness enhancement value of the target pixel, I(x) is the initial brightness value of the target pixel, and t(x) is atmospheric optical transmittance, and an expression of the atmospheric optical transmittance is:

$$t(x) = 1 - w\frac{I_B - E_V}{I_B - A}$$

where $I_B$ is the brightness value of the image, $E_V$ is the filtered brightness value of the target pixel, A is an atmospheric optical intensity value, and w is a non-zero constant.

The enhancement submodule 805 is configured to use the brightness enhancement value as an enhanced brightness value of the target pixel. After the brightness enhancement value of the target pixel is determined, the enhancement submodule 805 may adjust the brightness value of the target pixel to the brightness enhancement value to enhance the brightness of the target pixel.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 9:
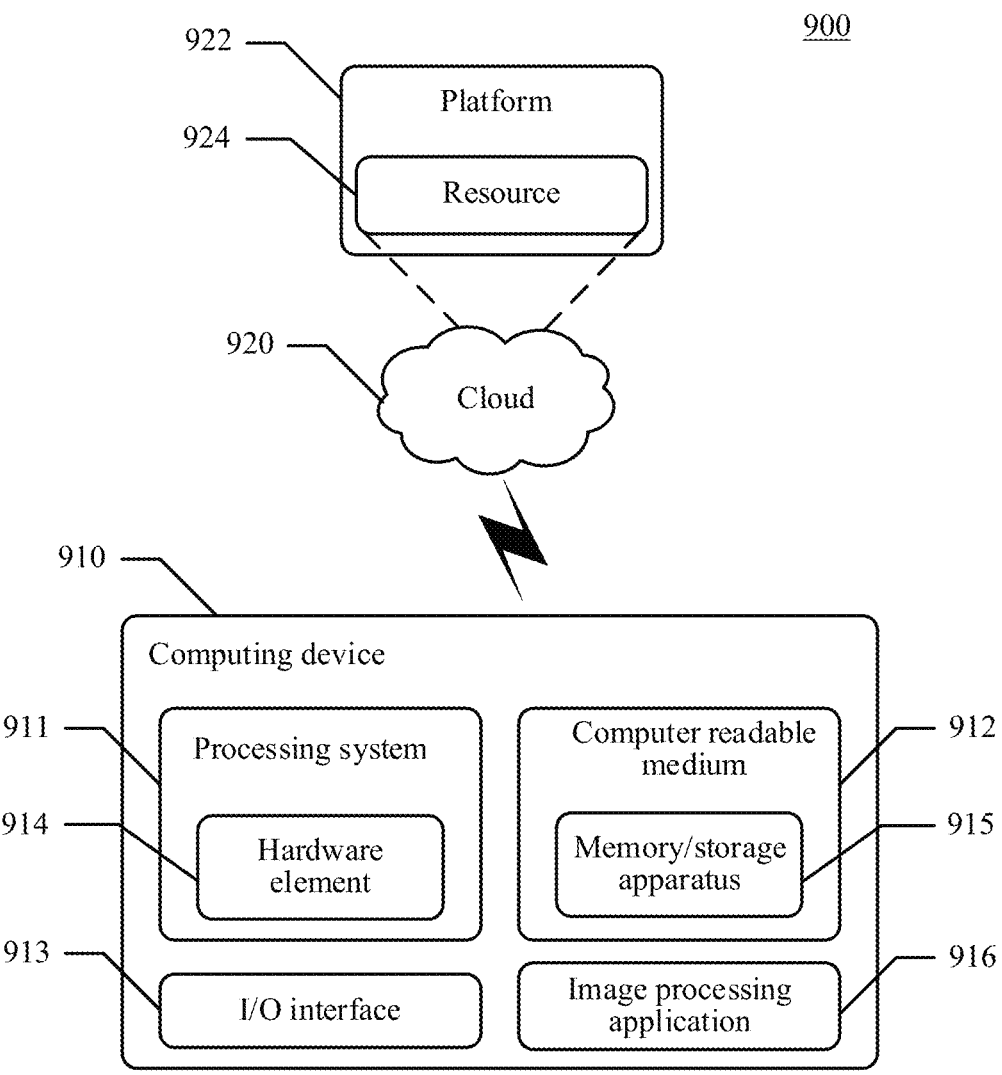
FIG. 9 shows an exemplary system, which includes an exemplary computing device representing one or more systems and/or devices capable of implementing various technologies described herein.

FIG. 9 shows an exemplary system 900, which includes an exemplary computing device 910 representing one or more systems and/or devices to implement various technologies described in the present disclosure. The computing device 910 may be, for example, a server of a service provider, a device associated with a server, a system-on-a-chip, and/or any other suitable computing device or computing system. The image processing apparatus 800 described above with reference to FIG. 8 may use a form of the computing device 910. Alternatively, the image processing apparatus 800 may be implemented as a computer program in a form of an image processing application 916.

The exemplary computing device 910 shown in the figure includes a processing system 911, one or more computer readable media 912, and one or more I/O interfaces 913 that are communicatively coupled to each other. Although not shown, the computing device 910 may further include a system bus or another data and command transfer system, which couples various components to each other. The system bus may include any one or a combination of different bus structures. The bus structure is, for example, a memory bus or a memory controller, a peripheral bus, a universal serial bus, and/or a processor or a local bus that uses any one of various bus architectures. Various other examples are also conceived, such as control and data lines.

The processing system 911 represents a function to perform one or more operations by using hardware. Therefore, the processing system 911 is shown to include a hardware element 914 that can be configured as a processor, a functional block, and the like. This may include implementation, in the hardware, as an application-specific integrated circuit or another logic device formed by using one or more semiconductors. The hardware element 914 is not limited by a material from which the hardware element is formed or a processing mechanism used herein. For example, the processor may be formed by (a plurality of) semiconductors and/or transistors (such as an electronic integrated circuit (IC)). In such a context, a processor executable instruction may be an electronic executable instruction.

The computer readable medium 912 is shown to include a memory/storage apparatus 915. The memory/storage apparatus 915 represents a memory/storage capacity associated with one or more computer readable media. The memory/storage apparatus 915 may include a volatile medium (such as a random-access memory (RAM)) and/or a non-volatile medium (such as a read-only memory (ROM), a flash memory, an optical disc, and a magnetic disk). The memory/storage apparatus 915 may include a fixed medium (such as a RAM, a ROM, and a fixed hard disk drive) and a removable medium (such as a flash memory, a removable hard disk drive, and an optical disc). The computer readable medium 912 may be configured in various other manners further described below.

The one or more I/O interfaces 913 represent functions to allow a user to input a command and information to the computing device 910, and, optionally, also allow information to be presented to the user and/or another component or device by using various input/output devices. An exemplary input device includes a keyboard, a cursor control device (such as a mouse), a microphone (for example, for speech input), a scanner, a touch function (such as a capacitive sensor or another sensor configured to detect a physical touch), a camera (for example, which may detect a motion that does not involve a touch as a gesture by using a visible or an invisible wavelength (such as an infrared frequency), and the like. An exemplary output device includes a display device (such as a monitor or a projector), a speaker, a printer, a network interface card, a tactile response device, and the like. Therefore, the computing device 910 may be configured in various manners further described below to support user interaction.

The computing device 910 further includes the image processing application 916. The image processing application 916 may be, for example, a software instance of the image processing apparatus 800, and implement the technologies described herein in combination with other elements in the computing device 910.

Various technologies may be described herein in a general context of software, hardware elements or program modules. Generally, such modules include a routine, a program, an object, an element, a component, a data structure, and the like for executing a particular task or implementing a particular abstract data type. The terms "module", "function" and "component" used herein generally represent software, firmware, hardware or a combination thereof. The features of the technologies described herein are platform-independent, which means that such technologies may be implemented on various computing platforms having various processors.

Implementations of the described modules and the technologies may be stored on a certain form of computer readable media or transmitted across a particular form of a computer readable medium. The computer readable medium may include various media that can be accessed by the computing device 910. By way of example, and not limitation, the computer-readable medium may include a "computer readable storage medium" and a "computer readable signal medium".

Contrary to pure signal transmission, a carrier or a signal, the "computer readable storage medium" is a medium and/or a device that can persistently store information, and/or a tangible storage apparatus. Therefore, the computer readable storage medium is a non-signal bearing medium. The computer readable storage medium includes hardware such as volatile and non-volatile, removable and non-removable media and/or storage devices implemented by using a method or a technology suitable for storing information (such as a computer readable instruction, a data structure, a program module, a logic element/circuit or other data). Examples of the computer readable storage medium include, but are not limited to, a RAM, a ROM, an EEPROM, a flash memory, or another memory technology, a CD-ROM, a digital versatile disk (DVD), or another optical storage apparatus, a hard disk, a cassette magnetic tape, a magnetic tape, a magnetic disk storage apparatus, or another magnetic storage device, or another storage device, a tangible medium, or an article of manufacture that is suitable for storing expected information and may be accessed by a computer.

The "computer-readable signal medium" is a signal bearing medium configured to send an instruction to hardware of the computing device 910, for example, by using a network. A signal medium can typically embody a computer-readable instruction, a data structure, a program module, or other data in a modulated data signal such as a carrier, a data signal, or another transmission mechanism. The signal medium further includes any information transmission medium. The term "modulated data signal" is a signal that has one or more of features thereof set or changed in such a manner as to encode information. By way of example, and not limitation, a communication medium includes a wired medium such as a wired network or direct-wired connection, and a wireless medium such as a sound medium, an RF medium, an infrared medium, and another wireless medium.

As described above, the hardware element 914 and the computer readable medium 912 represent an instruction, a module, a programmable device logic and/or a fixed device logic that are implemented in the form of hardware, which may be used, in some embodiments, for implementing at least some aspects of the technologies described herein. The hardware element may include a component of an integrated circuit or a system-on-a-chip, an application-specific integrated circuit (ASIC), a field-programmable gate array (FPGA), a complex programmable logic device (CPLD), and another implementation in silicon or another hardware device. In such a context, the hardware element may be used as a processing device for executing a program task defined by an instruction, a module, and/or a logic embodied by the hardware element, as well as a hardware device for storing an instruction for execution, such as the computer readable storage medium described above.

The above combination may also be configured to implement various technologies and modules described herein. Therefore, software, hardware or a program module and another program module may be implemented as one or more instructions and/or logic that are embodied on a certain form of a computer readable storage medium, and/or embodied by one or more hardware elements 914. The computing device 910 may be configured to implement a specific instruction and/or function corresponding to a software and/or hardware module. Therefore, for example, by using the computer readable storage medium and/or the hardware element 914 of the processing system, the module may be implemented, at least partially in hardware, as a module that can be executed as software by the computing device 910. The instruction and/or function may be executable/operable by one or more articles of manufacture (such as one or more computing devices 910 and/or processing systems 911) to implement the technologies, modules, and examples described herein.

In various implementations, the computing device 910 may use various different configurations. For example, the computing device 910 may be implemented as a computer type device including a personal computer, a desktop computer, or a multi-screen computer, a laptop computer, a netbook, and the like. The computing device 910 may also be implemented as a mobile apparatus type device including a mobile device such as a mobile phone, a portable music player, a portable game device, a tablet computer, and a multi-screen computer. The computing device 910 may also be implemented as a television type device including a device having or connected to a generally larger screen in a casual viewing environment. The devices include a television, a set-top box, a game console, and the like.

The technologies described herein may be supported by the various configurations of the computing device 910, which are not limited to specific examples of the technologies described herein. The function may also be completely or partially implemented on a "cloud" 920 by using a distributed system such as a platform 922 as described below.

The cloud 920 includes and/or represents the platform 922 for a resource 924. The platform 922 abstracts an underlying function of hardware (such as a server) and software resources of the cloud 920. The resource 924 may include an application and/or data that can be used when computer processing is performed on a server away from the computing device 910. The resource 924 may also include a service provided by means of the Internet and/or a subscriber network such as a cellular or Wi-Fi network.

The platform 922 can abstract the resource and the function to connect the computing device 910 to another computing device. The platform 922 may also be used for abstracting scaling of resources to provide a corresponding level of scale to encountered demand for the encountered resource 924 implemented through the platform 922. Therefore, in an interconnection device embodiment, the implementation of the functions described herein may be distributed throughout the system 900. For example, the functions may be partially implemented on the computing device 910 and by the means of the platform 922 that abstracts the function of the cloud 920.

For clarity, the embodiments of the present disclosure are described with reference to different functional units. However, obviously, without departing from the present disclosure, functionality of each functional unit may be implemented in a single unit, implemented in a plurality of units, or implemented as a part of another functional unit. For example, the functionality described as being performed by a single unit may be performed by a plurality of different units. A reference to a specific functional unit is only considered as the reference to an appropriate unit that is configured to provide the described functionality instead of indicating a strict logical or physical structure or organization. Therefore, the present disclosure may be implemented in the single unit, or may be distributed among different units and circuits physically and functionally.

It is to be understood that, although the terms such as, first, second, and third may be used for describing various devices, elements, components or parts, these devices, elements, components or parts are not to be limited by these terms. These terms are only used for distinguishing a device, an element, a component or a part from another device, another element, another component or another part.

The present disclosure is described in combination with some embodiments, which, however, is not intended to be limited to the specific form described herein. On the contrary, the scope of the present disclosure is limited only by the appended claims. Additionally, individual features may be included in different claims, but these features may be possibly advantageously combined, and the combination in different claims do not imply that the combination of features is not feasible and/or advantageous. An order of the features in the claims does not imply any specific order in which the features work. In addition, in the claims, the term "comprise" do not exclude another element, and the indefinite article "a" or "an" does not exclude a plurality of elements. Reference numerals in the claims are only provided as specific examples, which are to be construed as limiting the scope of the claims in any manner.

What is claimed is:

1. An image processing method, performed by a computing device, the method comprising:
   determining a brightness value of an image; and
   enhancing a brightness of the image when the brightness value of the image is less than an image brightness threshold, comprising:
   determining a pixel of the image as a target pixel;
   determining a brightness enhancement value of the target pixel based on the brightness value of the image, an initial brightness value of the target pixel, and initial brightness values of neighboring pixels of the target pixel; and
   using the brightness enhancement value as an enhanced brightness value of the target pixel.

2. The method according to claim 1, wherein the determining the brightness value of the image comprises:
   sampling pixels of the image at a sampling interval to obtain a brightness value corresponding to the sampled pixels;
   performing sampling rate smoothing on the brightness value of the sampled pixels to obtain a smoothed brightness value; and
   determining the smoothed brightness value as the brightness value of the image.

3. The method according to claim 2, wherein the determining the brightness value of the image further comprises:
   obtaining brightness components in color space data of the sampled pixels; and
   adding the brightness components of the sampled pixels to obtain a sum of brightness of the sampled pixels as the brightness value of the sampled pixels.

4. The method according to claim 3, wherein the color space data of the sampled pixels is YUV color space data.

5. The method according to claim 4, wherein the determining the brightness value of the image further comprises:
   obtaining RGB color space data of the image; and
   converting the RGB color space data of the image to obtain the YUV color space data of the image.

6. The method according to claim 2, wherein the performing sampling rate smoothing on the brightness value of the sampled pixels to obtain a smoothed brightness value comprises:
   dividing the brightness value of the sampled pixels by a square of the sampling rate to obtain the smoothed brightness value.

7. The method according to claim 1, wherein the sampling interval comprises a first interval component in a row direction and a second interval component in a column direction of the pixels of the image, the first interval component being a value obtained by dividing a quantity of pixels in the row direction by the sampling rate, and the second interval component being a value obtained by dividing a quantity of pixels in the column direction by the sampling rate.

8. The method according to claim 1, wherein the neighboring pixels of the target pixel comprise other pixels in a region with the target pixel as a central point.

9. The method according to claim 1, wherein the determining a brightness enhancement value of the target pixel based on the brightness value of the image, an initial brightness value of the target pixel, and initial brightness values of neighboring pixels of the target pixel comprises:
   filtering the initial brightness value of the target pixel, based on the initial brightness value of the target pixel and the initial brightness values of the neighboring pixels of the target pixel, to obtain a filtered brightness value of the target pixel; and
   determining the brightness enhancement value of the target pixel based on the brightness value of the image, the initial brightness value of the target pixel, and the filtered brightness value of the target pixel.

10. The method according to claim 9, wherein the filtering the initial brightness value of the target pixel to obtain a filtered brightness value of the target pixel comprises:
    determining a weighted sum of the initial brightness value of the target pixel and the initial brightness values of the neighboring pixels; and
    determining the weighted sum as the filtered brightness value of the target pixel.

11. The method according to claim 9, wherein the determining the brightness enhancement value of the target pixel comprises:

determining the brightness enhancement value of the target pixel according to the brightness value of the image, the initial brightness value of the target pixel, an atmospheric optical intensity value, and an atmospheric optical transmittance;

wherein the atmospheric optical transmittance is determined according to: the brightness value of the image, the filtered brightness value of the target pixel, and the atmospheric optical intensity value.

12. An image processing apparatus, comprising:
a memory, configured to store computer executable instructions; and
a processor, configured, when the computer executable instructions are executed by the processor, to:
determine a brightness value of an image; and
enhance a brightness of the image when the brightness value of the image is less than an image brightness threshold, comprising:
  determining a pixel of the image as a target pixel;
  determining a brightness enhancement value of the target pixel based on the brightness value of the image, an initial brightness value of the target pixel, and initial brightness values of neighboring pixels of the target pixel; and
  using the brightness enhancement value as an enhanced brightness value of the target pixel.

13. The apparatus according to claim 12, wherein the determining the brightness value of the image comprises:
sampling pixels of the image at a sampling interval to obtain a brightness value corresponding to the sampled pixels;
performing sampling rate smoothing on the brightness value of the sampled pixels to obtain a smoothed brightness value; and
determining the smoothed brightness value as the brightness value of the image.

14. The apparatus according to claim 13, wherein the determining the brightness value of the image further comprises:
obtaining brightness components in color space data of the sampled pixels; and
adding the brightness components of the sampled pixels to obtain a sum of brightness of the sampled pixels as the brightness value of the sampled pixels.

15. The apparatus according to claim 14, wherein the color space data of the sampled pixels is YUV color space data.

16. The apparatus according to claim 13, wherein the processor is further configured to: divide the brightness value of the sampled pixels by a square of the sampling rate to obtain the smoothed brightness value.

17. The apparatus according to claim 12, wherein the sampling interval comprises a first interval component in a row direction and a second interval component in a column direction of the pixels of the image, the first interval component being a value obtained by dividing a quantity of pixels in the row direction by the sampling rate, and the second interval component being a value obtained by dividing a quantity of pixels in the column direction by the sampling rate.

18. The apparatus according to claim 12, wherein the neighboring pixels of the target pixel comprise other pixels in a region with the target pixel as a central point.

19. The apparatus according to claim 12, wherein the processor is further configured to:
filter the initial brightness value of the target pixel, based on the initial brightness value of the target pixel and the initial brightness values of the neighboring pixels of the target pixel, to obtain a filtered brightness value of the target pixel; and
determine the brightness enhancement value of the target pixel based on the brightness value of the image, the initial brightness value of the target pixel, and the filtered brightness value of the target pixel.

20. A non-transitory computer readable storage medium, storing computer executable instructions, the instructions, when being executed by a processor, cause the processor to perform:
determining a brightness value of an image; and
enhancing a brightness of the image when the brightness value of the image is less than an image brightness threshold, comprising:
  determining a pixel of the image as a target pixel;
  determining a brightness enhancement value of the target pixel based on the brightness value of the image, an initial brightness value of the target pixel, and initial brightness values of neighboring pixels of the target pixel; and
  using the brightness enhancement value as an enhanced brightness value of the target pixel.

* * * * *